Figures 1, 2, 3, 4, 5, 6, 7, 8, 9, 10, 11:
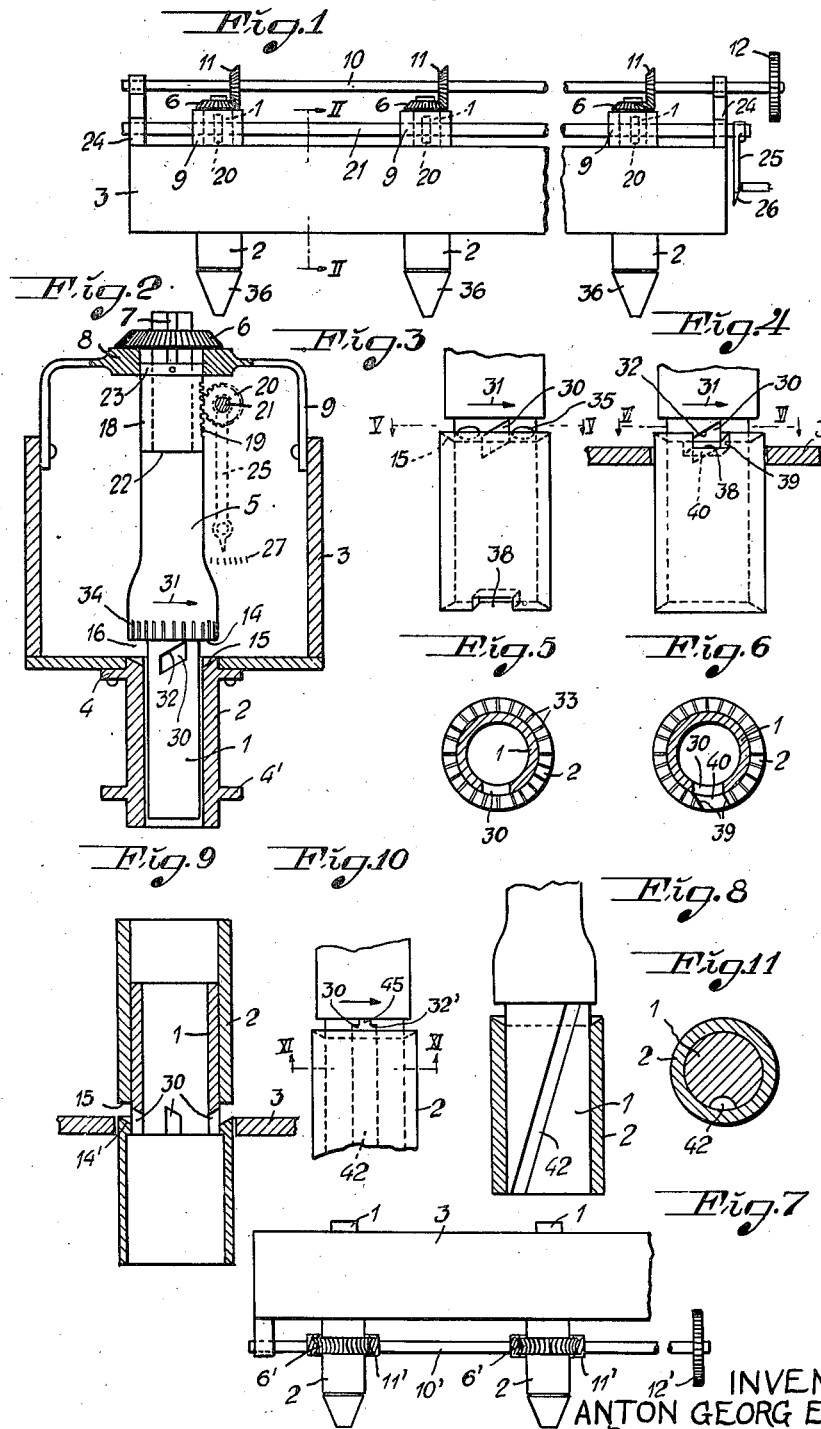

INVENTOR:
ANTON GEORG EWERTH
BY Haseltine, Lake & Co.
ATTORNEYS

Patented Sept. 7, 1943

2,328,716

UNITED STATES PATENT OFFICE 2,328,716

DISCHARGE MEANS FOR DRILL SOWING MACHINES

Anton Georg Ewerth, Stocksund, Sweden, assignor to Erik Vilhelm Walter Hallwyl Von Geijer, Vegeholm, Sweden Application August 16, 1939, Serial No. 290,406.
In Sweden July 19, 1939

14 Claims. (Cl. 221—130)

The present invention relates to drill sowing machines of the type which comprises a discharge means including a discharge member formed as a rotary element having a vertical or approximately vertical axis and adapted to discharge corn or seed in groups or singly. The object of the invention is to provide a discharge means in sowing machines of the type referred to in which corn of the most different sort and also seed of different size of grain may be discharged.

Primarily, the invention is characterized by the fact that the discharge member which is provided with one or more discharge holes, channels or other passages for receiving and discharging the grains singly or in groups is extended into a sleeve arranged in such relation to the discharge member as to cause the seed or corn present at the discharge member and the sleeve to successively pass the holes or channels and to be discharged on rotation of the discharge member and the sleeve relatively to each other. The discharge member may consist of a tube or a solid element of rotation, the holes or channels in the latter case being provided in the peripheral surface of the member. In the embodiment to be described hereinafter, the tubular discharge member may be replaced by the solid discharge member or vice versa. The sleeve may be arranged to rotate and the discharge member to be stationary or, alternatively, the discharge member may be rotary and the sleeve stationary. If desired, both the discharge member and the sleeve may be rotary.

According to an important feature of the invention an end surface of the sleeve and an opposite shoulder of the discharge member form a circumferential slot which the corn has to pass before it is discharged through the holes or indentations. The size (height) of said slot may be adapted to be varied in such a manner as to be adjusted to fit the particular kind of corn to be sown by the machine on the occasion in question. For instance, the height of the slot may be adjusted so as to compel oblong grains to lay themselves with their longitudinal axis extending in the direction of rotation to be able to pass the slot, whereby the discharge operation will be efficient and reliable. To obtain said adjustability the sleeve and the discharge member may be adjustable axially relatively to each other. The purpose of such adjustability may also be to uncover the discharge holes or channels from the end portion of the sleeve to a greater or less extent so as to suit the free passage of the discharge holes to the size of the grain to be sown.

Further features of the invention will be explained in the following description of some embodiments thereof which are illustrated by way of example in the accompanying drawing, in which—

Fig. 1 is an elevation of a seed hopper having a number of discharge units mounted therein, Fig. 2 is a cross-sectional view of the seed hopper on an enlarged scale illustrating some elements of a discharge means in section, Figs. 3 and 4 are vertical elevations of the sleeve and a portion of the discharge member illustrating the sleeve in a position for sowing singly and in a converted position for sowing in groups, respectively, Figs. 5 and 6 are cross-sectional views along lines V—V and VI—VI in Figs. 3 and 4, respectively, Fig. 7 is an elevation corresponding to Fig. 1 of a further embodiment, Fig. 8 is a detail view of a discharge means having a modified discharge channel, Fig. 9 is an axial section of a further modification of the discharge tube and the sleeve, Fig. 10 is a vertical elevation of a detail, and Fig. 11 is a sectional view on line XI—XI in Fig. 10.

The discharge means comprises a discharge member 1 and a sleeve 2 mounted in a seed hopper 3. Any suitable number of discharge units consisting of a sleeve and a tube or solid discharge member may be mounted in one and the same seed hopper spaced from each other correspondingly to the distance between the furrows in which the corn is to be sown. Fig. 1 illustrates three units but a greater or less number may be used.

In the embodiment disclosed in Figs. 1 and 2, the sleeve 2 has one end thereof fitted into a bottom aperture in the seed hopper and is secured to the bottom of said hopper by a flange 4. In this case the discharge tube is rotary. To this end, the tube has an extension 5 projecting upwardly through the seed hopper and carrying at the top thereof a bevelled gear 6 which is displaceable on the extension 5 and on rotation can rotate this extension and the tube by way of a spline 7. The gear 6 is supported by a bearing 8 which is carried by a bracket 9 secured to the seed hopper 3 (or to the machine frame), and which may also be formed as a bearing for the extension 5. Fixed on a shaft 10 journalled in the frame of the machine and extending in the longitudinal direction of the seed hopper 3 are a number of bevel gears 11 each engaging the bevel gear 6 of one of the discharge units. The shaft 10 carries a driving wheel 12 fixed on one end thereof and obtaining its motion from the travelling wheels of the sowing machine in any suitable manner. A circumferential shoulder 14 (Fig. 2) on the discharge tube 1 and the upper end surface 15 of the sleeve 2 form a slot 16 the size of which is adjusted with regard to the size of grain of the seed to be discharged. In case of oblong grains it is adjusted so as to compel the grains to take a lying position to be able to pass the slot. In consequence, the slot should be narrower than the length of the grain. The size of the slot may be made variable by arranging the discharge tube 1 so as to be capable of being displaced axially in relation to the sleeve 2. Such adjustability may be effected by any suitable means. Fig. 2 illustrates an adjusting means comprising a sleeve 18 journalled on a reduced portion of the extension 5 and carrying a toothed rack 19 which cooperates with a gear 20 which is splined to an adjusting shaft 21 extending in the longitudinal direction of the hopper. The sleeve 18 is mounted between a shoulder 22 and a stop ring 23 on the extension 5 but does not prevent rotation of the extension for effecting the rotation of the discharge tube. As suggested in Fig. 1, the adjusting shaft is carried by bearings 24 at the ends of the hopper 3, and at one end the shaft has a crank 25 having a pointer 26 which, on operation of the crank, moves along an index scale 27 mounted on the end of the hopper (Figs. 1 and 2). The shaft 21 carries a gear 20 for each discharge unit and, therefore, on operation of the crank all the discharge tubes will be moved upwardly or downwardly by means of the gears 20 and the racks 19. The graduation of the scale 27 may be such as to enable direct reading of the size of the slot 16. As a result, it is possible to adjust the discharge tube by means of the crank 25 so as to set the shoulder 14 at the desired distance from the end surface 15 of the sleeve according to the kind of corn to be sown on the occasion in view.

The end surface 15 of the sleeve 2 extends obliquely inwardly towards the discharge tube, as more particularly illustrated in Fig. 2. Closely below the shoulder 14 of the discharge tube 1 there are one or more discharge holes 30 provided in the wall of the discharge tube 1. These holes extend obliquely and downwardly to a point somewhat below the oblique end surface 15 of the sleeve 2. At the top the hole is limited by an edge 32 extending downwardly and rearwardly (as looked in relation to the direction of rotation indicated by the arrow 31). On axial adjustment of the discharge tube 1 the discharge hole is uncovered to a greater or less extent above the oblique end surface 15 of the sleeve. For example, in case of discharging particularly small grains the discharge tube is adjusted so as to uncover the upper triangular corner of the discharge hole only, and in case of larger grains a great portion of the hole is positioned above the end surface 15 of the sleeve.

The oblique end surface 15 may have transverse or radial grooves 33, whereas the shoulder 14 situated above suitably is plane and even. Axial grooves 34 may further be provided at the extension of the discharge tube 1 around the periphery closely above the shoulder 14. The inclination of the grooves 33 and 34 as well as the inclination of the end surface 15 assist in causing the oblong grains to take a lying position at and in the slot 16 on rotation of the tube.

The operation of the discharge means is illustrated particularly by Fig. 3. The grains present around the discharge tube and its extension in the seed hopper will be fed successively into the slot at the rotation of the feed tube, the oblong grains being compelled to take such a position as to have their longitudinal direction in the direction of rotation due to the height of the slot and the relative motion between the tube 1 and the sleeve 2. The grains lay themselves in a row 35 on the oblique end surface 15 around the periphery of the tube, as illustrated in Fig. 3. As the hole 30 passes the grains in said row these grains slide down along the oblique end surface 15 and through the hole into the tube through which they fall down on the ground. A tapering collection funnel 36 (Fig. 1) may be arranged below each tube to concentrate the seed to one point in alignment with the centre of the tube.

In case of sowing the grains singly the discharge tube is adjusted so as to uncover the discharge holes only to an extent sufficient to allow one grain to pass the hole at a time. In sowing groups of corn it may be suitable to provide one or more indentations or grooves or slots in the end surface of the sleeve to enable the entire discharge hole or a great portion thereof to be uncovered temporarily. Such slots may advantageously be provided in the bottom edge of the sleeve 2 which is removable so that it may be converted and inserted into the bottom aperture of the seed hopper, the end portion with the slot extending to some extent above the bottom of the seed hopper. This position of the sleeve is illustrated in Fig. 4 in which the end slot or indentation is designated by 38. The side edges 39 of the slot do not extend radially but run obliquely opposite to the direction of rotation, and the bottom edge 40 of the slot is inclined inwardly like the end surface of the sleeve. The discharge hole 30 and the slot 38 have their length, counted in the direction of rotation, such that a plurality of grains are able to pass the uncovered portion of the discharge hole simultaneously when this hole passes the slot and, as a result, a plurality of grains will be discharged simultaneously. This arrangement is particularly suited to sowing beet seed.

For the purpose of mounting the sleeve in a converted position to the bottom of the seed hopper the sleeve may be provided with for example a flange 4' like the flange 4 at the opposite end (Fig. 2).

In the embodiment now described the discharge tube has been assumed to be rotary and the sleeve 2 to be stationary. Fig. 7 illustrates a modification in which the sleeve is rotary and the discharge tube 1 stationary. For driving purpose the sleeve may be provided with a worm gear 6', which meshes with a worm 11' mounted on a shaft 10' which extends below the seed hopper 3 and is moved from the travelling wheels of the sowing machine by way of a driving wheel 12' secured to the shaft as in the foregoing embodiment. The shaft 10' carries one worm for each worm gear.

Furthermore, it is possible to provide the sleeve 2 for axial adjustment instead of the discharge tube 1; in such case, the sleeve may comprise or be provided with adjusting means similar to the elements 18 to 27 shown in Fig. 2.

As an alternative to the discharge holes passed completely through the wall of the discharge tube, it is possible to furnish the outer peripheral surface of the tube with one or more channels or grooves which are extended downwardly in one or more passages between the tube and the sleeve. This is illustrated by way of example in Fig. 8 in which the channel or passage is designated by 42.

Instead of extending the discharge tube from the top and downward into the sleeve it is possible to dispose the sleeve at the top in the seed hopper, the discharge tube projecting into the bottom end of the sleeve. Such modification is illustrated in Fig. 9 in which the discharge tube, as before, is designated by 1 and the sleeve by 2. In distinction from the foregoing embodiment the shoulder 14' of the tube is directed upwards and inclined inwardly in this case while the opposite end surface 15' of the sleeve which forms the discharge slot together with the shoulder 14' is substantially plane. A number of discharge holes 30 are provided in the tube 1 as in the foregoing embodiment.

The shape of the discharge hole shown in Figs. 3 and 4 in which the hole has an oblique upper edge causes a relatively considerable axial displacement of the discharge member on shifting from sowing large grains to small ones. A less adjusting movement may be obtained by the shape of the hole or channel which is illustrated in Figs. 10 and 11. In this form the top edge 32' of the hole 30' forms steps which result in a small passage opening 45 intended for particularly small grains when the discharge tube has been displaced downward to such an extent that the edge 32' has come on a level with the inner top edge of the sleeve 2.

Further modifications beyond those illustrated in the drawing may occur within the scope of the invention.

What I claim is:

1. In a seed or corn discharge means for drill sowing machines, a discharge member with a substantially vertical longitudinal axis, a sleeve surrounding said discharge member, means to rotate said sleeve and said member relatively to each other, a passage in said discharge member for successively receiving and discharging the seed or corn, a narrow oblique surface portion on said sleeve and an opposite shoulder on said discharge member to form a circumferential guide space for receipt of the seed or corn and to definitely arrange the individual grains in a row on said narrow oblique surface before they escape through said passage, whereby to obtain a uniform discharge of the seed or corn.

2. A seed or corn discharge means comprising in combination with a hopper, a sleeve disposed with its longitudinal axis substantially vertical in said hopper, a discharge member extending axially into said sleeve, means to rotate said sleeve and said discharge member relatively to each other, a passage in said discharge member for successive receipt and discharge of the seed or corn, an oblique end surface on said sleeve, said surface sloping towards the discharge member, and a shoulder on said discharge member forming a guide slot for the seed or corn together with said oblique end surface.

3. A seed or corn discharge means comprising in combination a sleeve having a substantially vertical axis, a discharge member extending axially into said sleeve, means to rotate said sleeve and said discharge member relatively to each other, an oblique circumferential surface on said sleeve, a shoulder on said discharge member disposed opposite to said circumferential surface to form a discharge slot, and a hole closely below said shoulder to receive and discharge seed or corn which has passed said slot.

4. A seed or corn discharge means comprising in combination, a sleeve having a substantially vertical axis, a discharge tube extending into said sleeve, means to rotate the tube and sleeve relatively to each other, an oblique circumferential surface portion on said sleeve, a shoulder on said discharge tube disposed opposite to said circumferential surface portion on said sleeve, a discharge hole extending through the wall of said tube obliquely downwards for successively receiving and discharging seed or corn present at the sleeve and the discharge member on the relative rotation thereof.

5. A seed or corn discharge means comprising in combination a sleeve having a substantially vertical axis, a discharge tube extending axially into said sleeve, means to rotate said sleeve and said discharge tube relatively to each other, an oblique circumferential surface portion on said sleeve, a shoulder on said discharge tube disposed opposite to said circumferential surface portion on said sleeve, and a discharge hole or holes in the wall of said tube, the top edge of each hole extending obliquely downwards and backwards in relation to the direction of rotation of the tube or sleeve.

6. A seed or corn discharge means comprising in combination with a hopper having an aperture in the bottom thereof, a sleeve mounted removably in said hopper, with one end thereof fitting in said aperture and the other end constructed to fit thereinto after removal and conversion of the sleeve, a discharge tube extending axially into said sleeve, means to rotate said sleeve and said discharge tube relatively to each other, a discharge hole or holes in the wall of said tube, and one or more grooves or recesses in one end of said sleeve corresponding to the hole or holes in the discharge tube to form together with said hole or holes a passage or passages for receipt and discharge of the seed or corn successively.

7. A seed or corn discharge means for drill sowing machines comprising in combination with a hopper, a number of discharge members with a substantially vertical axis, a number of sleeves each receiving one discharge member, means to rotate said discharge members relatively to said sleeves, a passage portion in each discharge member for successively receiving and discharging the seed or corn, an oblique surface portion on each sleeve and a corresponding shoulder on each discharge member forming a circumferential guide space for receiving the seed or corn preparatory to escape thereof through said passage portion, and an adjusting means common to all discharge members to displace all of said members axially at a time in relation to the sleeves to adjust the vertical breadth of said guide spaces.

8. A seed or corn discharge means for drill sowing machines comprising in combination with a hopper, a number of discharge members with a substantially vertical axis, a number of sleeves each receiving one discharge member, means to rotate said discharge members relatively to said sleeves, a passage portion in each discharge member for successively receiving and discharging the seed or corn, an oblique surface on each sleeve and a corresponding shoulder on each discharge member forming a circumferential guide space for receiving the seed or corn preparatory to escape thereof through said passage portion, and an adjusting means common to all sleeves to displace all such sleeves axially at a time in relation to the discharge members to adjust said guide spaces.

9. A seed or corn discharge means comprising in combination a sleeve having a substantially vertical axis, a discharge tube extending axially into said sleeve, means to rotate said sleeve and said discharge tube relatively to each other, a discharge hole or holes in the wall of said tube, the top edge of each hole being formed with steps ascending obliquely in the direction of the axis of the discharge tube to form a small passage for seed or corn having small grains, an oblique surface portion on said sleeve, and a shoulder on said discharge tube forming a circumferential guide space for receiving the seed or corn preparatory to the escape thereof through said passage.

10. A seed or corn discharge means comprising in combination a sleeve disposed in upright position on a vertical axis, a discharge member extending axially into said sleeve, means to rotate said sleeve and said discharge member relatively to each other, a passage in said discharge member for successively receiving and discharging the seed or corn, and an end surface portion on said sleeve having substantially radial grooves therein and a shoulder on said discharge member forming a circumferential slot with said end surface portion for receiving the seed or corn before the discharge thereof through said passage.

11. A seed or corn discharge means comprising in combination a sleeve disposed in upright position on a vertical axis, a discharge member extending axially into said sleeve, means to rotate said sleeve and said discharge member relatively to each other, a passage in said discharge member for successively receiving and discharging the seed or corn, and an end surface portion on said sleeve and a shoulder on said discharge member forming a circumferential slot with said end surface portion for receiving the seed or corn before the discharge thereof through said passage, and said shoulder being provided with substantially transverse grooves therein.

12. A seed or corn discharge means comprising in combination a sleeve disposed in upright position on a vertical axis, a discharge member extending axially into said sleeve, means to rotate said sleeve and said discharge member relatively to each other, a passage in said discharge member for successively receiving and discharging the seed or corn, and an end surface portion on said sleeve having substantially radial grooves therein and a shoulder on said discharge member forming a circumferential slot with said end surface portion for receiving the seed or corn before the discharge thereof through said passage, and said shoulder forming a plane smooth surface.

13. A seed or corn discharge means comprising in combination a sleeve disposed in upright position on a vertical axis, a discharge member extending axially into said sleeve, means to rotate said sleeve and said discharge member relatively to each other, a passage in said discharge member for successively receiving and discharging the seed or corn, and an end surface portion on said sleeve and a shoulder on said discharge member to form a circumferential slot for receiving the seed or corn before the discharge thereof through said passage, said shoulder having a substantially flat surface portion and said passage having a limited size and oblique shape in said discharge member for limiting the same to accommodating seed or corn having small grains.

14. A seed or corn discharge means comprising in combination a sleeve disposed in upright position on a vertical axis, a discharge member extending axially into said sleeve, means to rotate said sleeve and said discharge member relatively to each other, a passage in said discharge member for successively receiving and discharging the seed or corn, an oblique surface portion on said sleeve having transverse grooves therein, and a substantially smooth plane shoulder on said discharge member forming a circumferential space for receiving the seed or corn preparatory to the discharge thereof through said passage.

ANTON GEORG EWERTH.